United States Patent
Debata et al.

(10) Patent No.: US 11,314,463 B2
(45) Date of Patent: Apr. 26, 2022

(54) FIRMWARE ACTIVATION IN A RAID STORAGE ENVIRONMENT

(71) Applicant: Dell Products L.P., Round Rock, TX (US)

(72) Inventors: Smruti Ranjan Debata, Basavanagar (IN); Muniswamy Setty K S, Bangalore (IN); Santosh Gore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 16/832,462

(22) Filed: Mar. 27, 2020

(65) Prior Publication Data

US 2021/0303217 A1  Sep. 30, 2021

(51) Int. Cl.
*G06F 3/06* (2006.01)
*G06F 8/65* (2018.01)

(52) U.S. Cl.
CPC ............ *G06F 3/0689* (2013.01); *G06F 3/061* (2013.01); *G06F 3/0632* (2013.01); *G06F 3/0653* (2013.01); *G06F 8/65* (2013.01)

(58) Field of Classification Search
CPC ...... G06F 3/0689; G06F 3/061; G06F 3/0632; G06F 3/0653; G06F 8/65; G06F 8/654
See application file for complete search history.

(56) References Cited

U.S. PATENT DOCUMENTS

2012/0260242 A1* 10/2012 Nguyen ............... G06F 8/656 717/168
2016/0092272 A1* 3/2016 Karaje ............... G06F 3/061 718/104

OTHER PUBLICATIONS

"Storage disk firmware update", 2019, NetApp. (Year: 2019).*
SAN Fabric Administration Best Practices Guide, Brocade, p. 12. (Year: 2013).*

* cited by examiner

*Primary Examiner* — Kalpit Parikh
(74) *Attorney, Agent, or Firm* — Baker Botts L.L.P.

(57) ABSTRACT

Methods, systems, and computer programs encoded on computer storage medium, for performing firmware activation, including obtaining input/output (I/O) metrics of the disks; determining an index value for the disk based on a disk weighted index (DWI); determining a DWI value for the array of disks based on the index value for each disk of the array of disks; comparing the DWI value for the array of disks to a DWI threshold; determining that the DWI value for a first array of disks is greater than the DWI threshold, and in response: aggregating the I/O metrics for each disk of the first array of disks; comparing the aggregated I/O metrics for the first array of disks to an activation threshold; determining that the aggregated I/O metrics for the first array of disks is less than the activation threshold, and in response triggering firmware activation for the first array of disks.

20 Claims, 7 Drawing Sheets

| Disk ID | Target Group(s) | DWI |
|---|---|---|
| 0_1 | ∑ WRKLD_WITHIN_THRESHOLD (0) + MIRROR_DISK_EXISTS (0) | 0 |
| 0_2 | ∑ HOTSPARE_STANDBY (0) + HOTSPARE_POOL_STANDBY (0) | 0 |
| 1_2 | DISK_OFFLINE | 0 |
| 1_3 | ∑ ACTIVATION_TAKES_LONGER (2) + WRKLD_ABOVE_THRESHOLD (3) | 5 |
| ... | ... | ... |
| 5_2 | ∑ MIRROR_DISK_EXISTS (0) ACTIVATION_TAKES_LONGER (2) + WRKLD_WITHIN_THRESHOLD (0) | 2 |

FIRMWARE ACTIVATION IN A RAID STORAGE ENVIRONMENT

BACKGROUND

Field of the Disclosure

The disclosure relates generally to firmware activation in a RAID storage environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Firmware update of online disks (e.g., SATA, SAS, NVMe) involves 2 steps—staging disk firmware to its respective disk controller, and active reset of firmware by issuing commands to disk controllers (based on type, make, vendor, etc.). After staging each disks firmware, activation actions for the disk types behind RAID controller(s) can be associated with such issues, including 1) as the activation process can take a longer time (5 seconds to 10 minutes per disk) depending upon its type, make, vendor and number disks participating in the RAID configuration, this can increases the overall RAID subsystem/group load for compute node as there involves queued I/O requests etc.; 2) existing mechanisms of firmware update are unaware of current subsystem load while triggering update action for disks behind RAID controller(s); and 3) some firmware activation action for disks are performed in a serial/sequential manner within a RAID subsystem which prolong the firmware activation process impacting I/O.

SUMMARY

Innovative aspects of the subject matter described in this specification may be embodied in a method of performing firmware activation, including obtaining, for each individual disk of a plurality of arrays of disks, input/output (I/O) metrics of the disks; determining, for each individual disk of each array of disks, an index value for the disk based on a disk weighted index (DWI), the DWI associating index values with respective types of disks; determining, for each array of disks of the plurality of arrays of disks, a DWI value for the array of disks based on the index value for each individual disk of the array of disks; comparing, for each array of disks of the plurality of arrays of disks, the DWI value for the array of disks to a DWI threshold; determining, based on the comparing, that the DWI value for a first array of disks is greater than the DWI threshold, and in response: aggregating the I/O metrics for each individual disk of the first array of disks; comparing the aggregated I/O metrics for the first array of disks to an activation threshold; determining that the aggregated I/O metrics for the first array of disks is less than the activation threshold; and in response to determining that the aggregated I/O metrics for the first array of disks is less than the activation threshold, triggering firmware activation for the first array of disks.

Other embodiments of these aspects include corresponding systems, apparatus, and computer programs, configured to perform the actions of the methods, encoded on computer storage devices.

These and other embodiments may each optionally include one or more of the following features. For instance, determining, based on the comparing, that the DWI value for a second array of disks is less than the DWI threshold, and in response, triggering firmware activation for the second array of disks. The activation threshold is based on an usage of the first array of disks being substantially zero. In response to determining that the DWI value for the first array of disks is greater than the DWI threshold: determining that an activation counter associated with the first array of disks is greater than or equal to a counter threshold; and in response to determining i) that the DWI value for the first array of disks is greater than the DWI threshold and ii) that the activation counter associated with the first array of disks is greater than or equal to the counter threshold, triggering firmware activation for the first array of disks. In response to determining that the DWI value for the first array of disks is greater than the DWI threshold: determining that an activation counter associated with the first array of disks is less than a counter threshold; and in response to determining that the activation counter associated with the first array of disks is less than the counter threshold, increasing the activation counter. In response to determining that i) that the DWI value for the first array of disks is greater than the DWI threshold and ii) that the activation counter associated with the first array of disks is less than or equal to the counter threshold, determining that a time period associated with the first array of disks is greater than a time threshold; and in response to determining that the time period associated with the first array of disks is greater than the time threshold, triggering firmware activation for the first array of disks. Determining that a third array of disks of the plurality of arrays of disks includes a mirrored array of disks, and in response: triggering parallel firmware activation for a first group of disks of the third array of disks; and after triggering parallel firmware activation for the first group of disks of the third array of disks, triggering parallel firmware activation for a second group of disks of the third array of disks, the second group of disks separate from the first group of disks.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 4 illustrates an example graph illustrating aggregated I/O metrics for arrays in a RAID storage environment.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
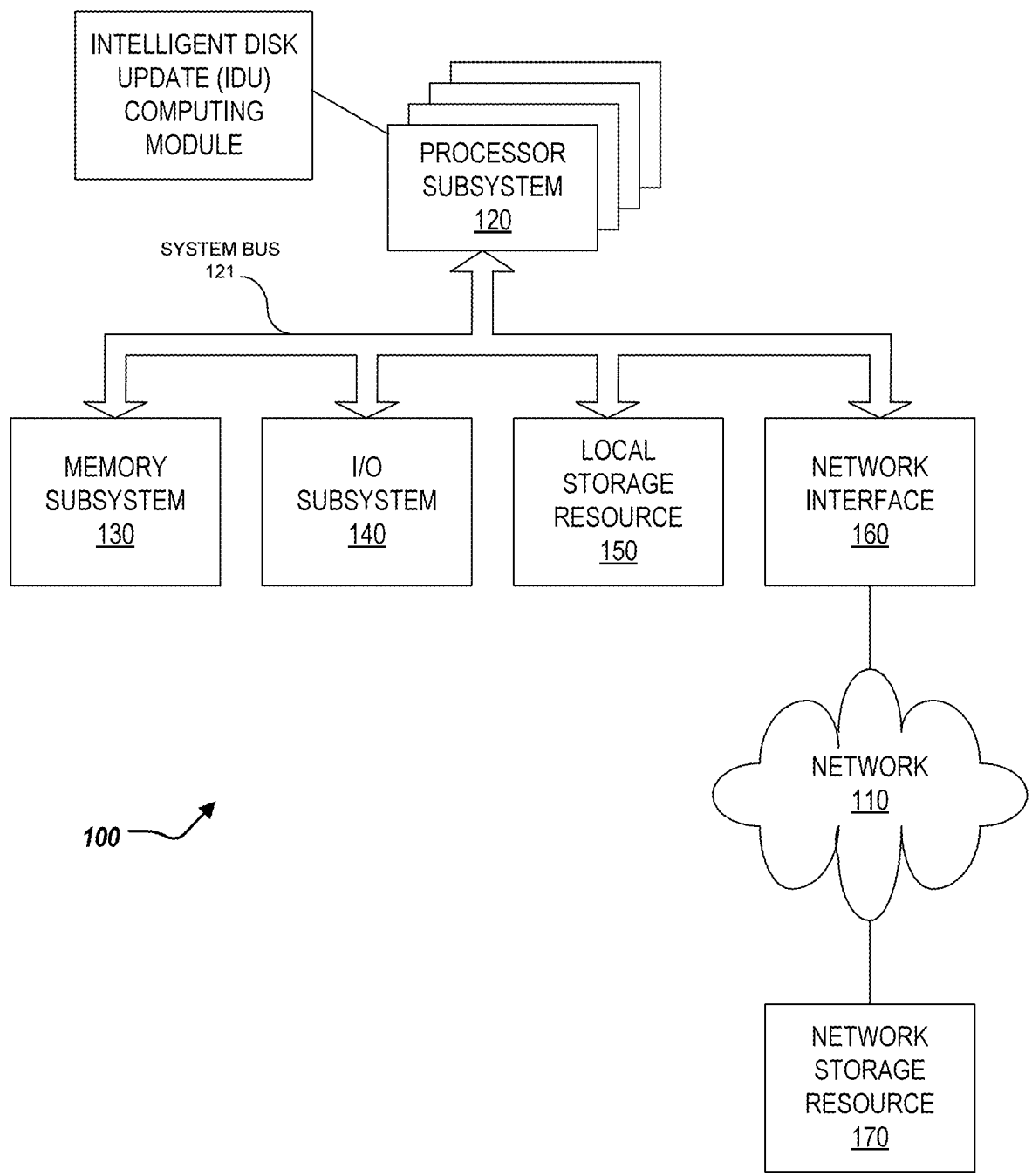
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can include an intelligent disk update (IDU) computing module 190. For example, the IDU computing module 190 can be included by the processor subsystem 120, and/or in communication with the processor subsystem 120. The IDU computing module 190 is described further herein.

Figure 2:
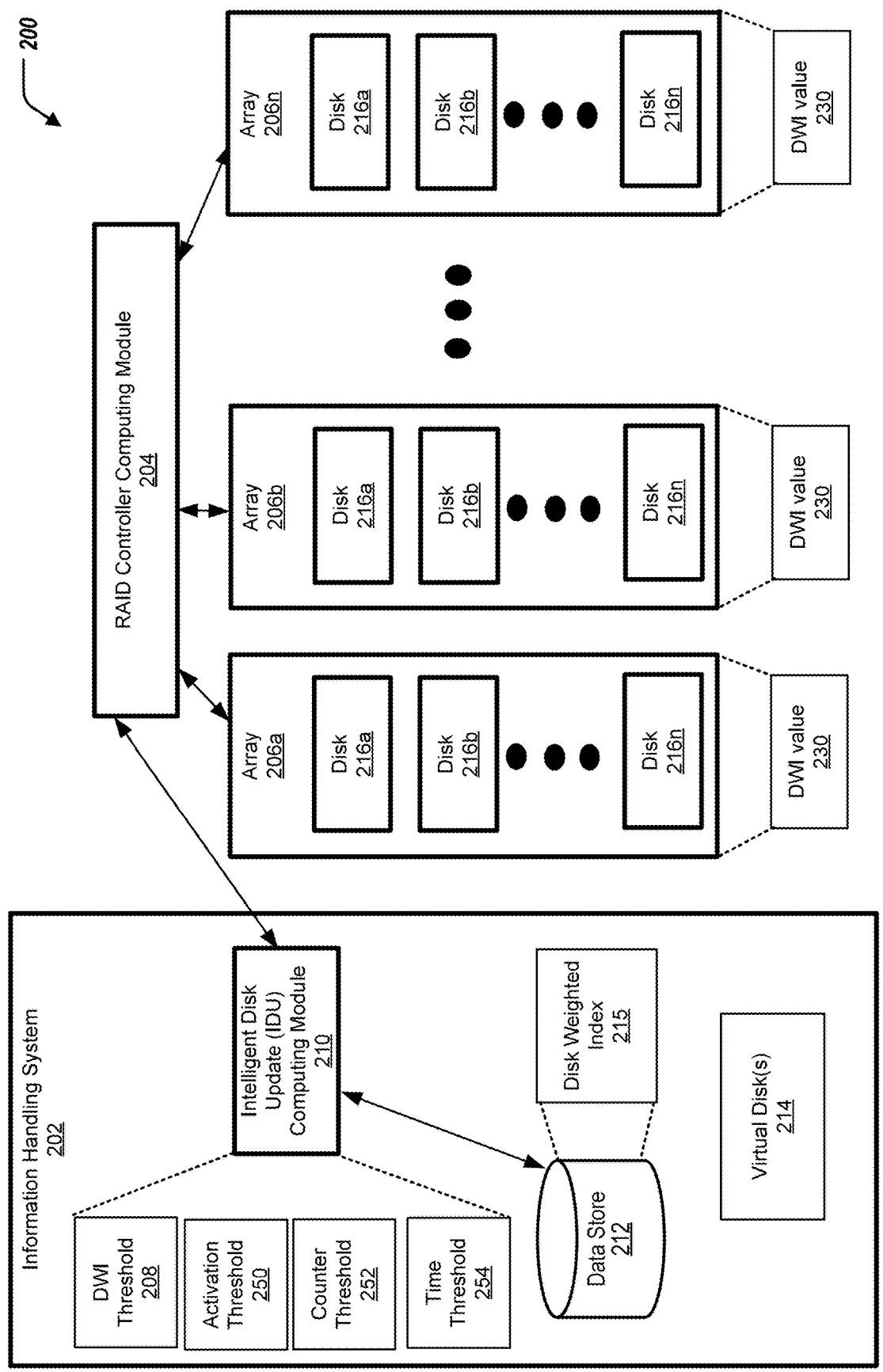
FIG. 2 illustrates a block diagram of the information handling system for firmware activation in a RAID storage environment.
Figure 3:
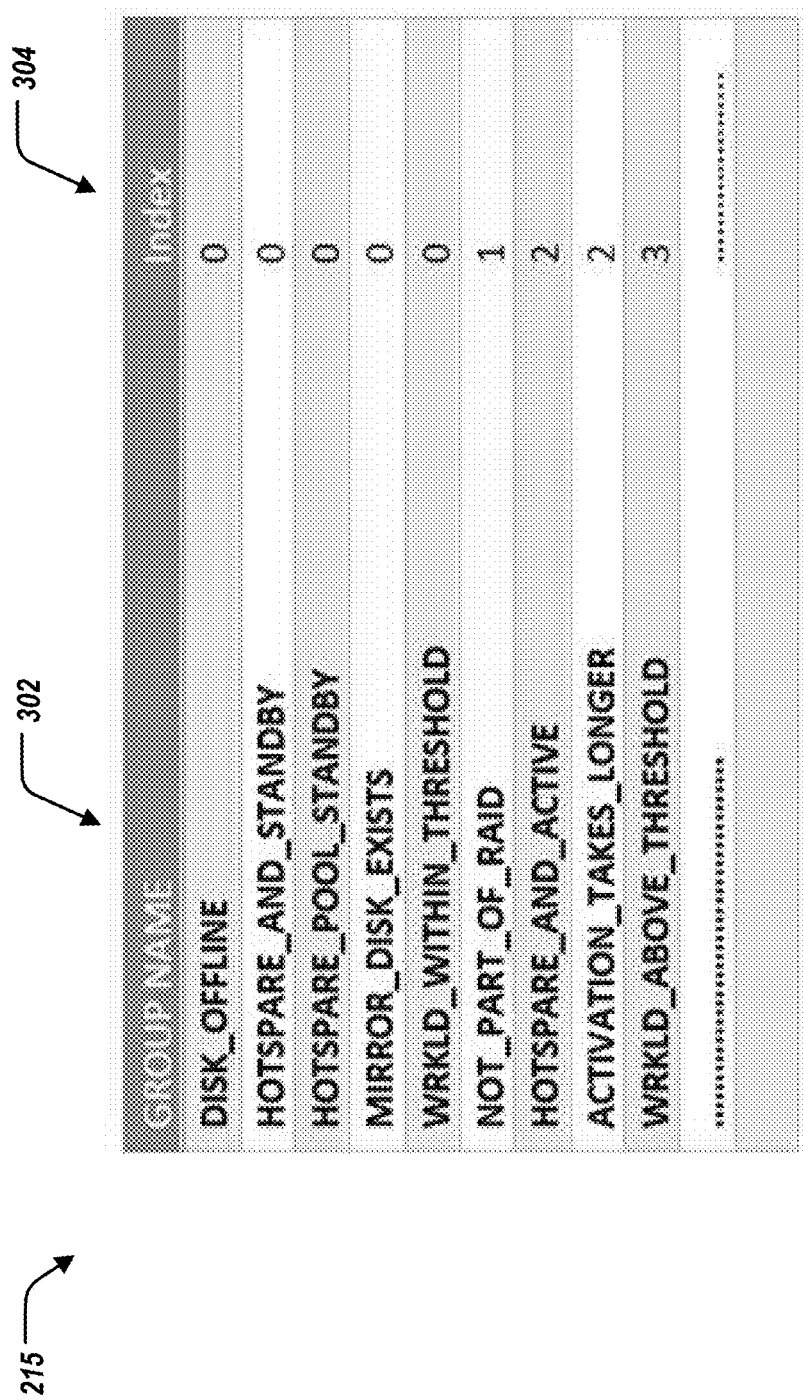
FIG. 3 illustrates an example graph illustrating a disk weighted index used for firmware activation in a RAID storage environment.

Turning to FIG. 2, FIG. 2 illustrates a computing environment 200 including an information handling system 202, a redundant array of individual disks (RAID) controller computing module 204, and arrays 206a, 206b, . . . , 206n (collectively referred to as arrays 206). The information handling system 202 can be similar to the information handling system 100 of FIG. 1. The number of arrays 206 can depend on the application desired.

The information handling system 202 can include an intelligent disk update (IDU) computing module 210, a data store 212, and virtual disk(s) 214. The data store 212 can include a disk weighted index (DWI) 215. Each array 206 can include disks 216a, 216b, . . . , 216n (collectively referred to as disks 216). The number of disks 216 for each array 206 can depend on the application desired. The IDU computing module 210 can be the same, or substantially similar to, the IDU computing module 190 of FIG. 1.

The information handling system 202 can be in communication with the RAID controller computing module 204. The RAID controller computing module 204 can be in communication with the arrays 206. In some examples, the IDU computing module 210 uses a PDM interface (when called from a host OS/HV) to stage and activate the disk firmware update. In some examples, the IDU computing module 210 uses a i2C/MCTP channel (when called from a H/W controller) to stage and activate the disk firmware update.

In short, the computing environment 200 can facilitate performing staged firmware activation for the arrays 206. The IDU computing module 210 can generate the DWI 215 for a specific time instance and associating the disks 216 into one or more pre-defined group(s) to trigger a firmware activation action to minimize, or reduce, input/output (I/O) impact of the arrays 216 during the updating process. The IDU computing module 210, during the firmware update process, with every poll of metric data of the arrays 206, aggregates the values of the disks 216 and compares such with predefined thresholds to trigger or schedule a firmware activation action, described further herein.

In some implementations, the IDU computing module 210 can generate the DWI 215. The DWI 215 associates an index value with each respective pre-defined grouping of disks, or type of disk. Specifically, FIG. 3 displays an example DWI 215. The DWI 215 associates, for each group 302 (or group type) of disks, an index value 304. The groups 302 and the index values 304 can be configurable based on the application desired. For example, the group 302 titled "DISK_OFFLINE" is associated with the index value 304 of zero; and the group 302 titled "WRKLD_ABOVE_THRESHOLD" is associated with the index value 304 of three.

The IDU computing module 210 can calibrate the DWI 215 periodically, or in response to a request. The IDU computing module 210 can calibrate/update the DWI 215 based on received metrics regarding the arrays 206 when there is a firmware update action triggered, described further herein (e.g., from an update package).

In some implementations, the IDU computing module 210 can obtain, for each disk 216 of the arrays 206, input/output (I/O) metrics of the disks 216. The IDU computing module 210 communicates with the RAID controller computing module 204 to obtain the I/O metrics. Specifically, the IDU computing module 210 polls and collates in a configured interval from self-monitoring analysis and reporting technology (SMART) logs and disk I/O usage data from the RAID controller computing module 204 as time-series data.

In some examples, the IDU computing module 210 obtain the I/O metrics of the disks 216 based on storage limitations of the data store 212. In some examples, the IDU computing module 210 purges data relating to the I/O metrics of the disks 216 based on storage limitations of the data store 212.

In some examples, the IDU computing module 210 can generate the grouping of the disks 216 under the virtual disk(s) 214 to monitor the load pattern for the disk attributes (I/O metrics) from the SMART logs.

In some implementations, the IDU computing module 210 determines the index value 304 for each disk 216 for each array 206. Specifically, the IDU computing module 210 can tag individual disks 216 for each array 206 based on the classification of the disk 216 within one or more of the groups 302. In some examples, the disk 216 can be classified into two or more of the groups 302.

The IDU computing module 210 can determine, for each array 206, a DWI value 230 for the array 206 based on the index values 304 for each disk 216 of the array 206. Specifically, the IDU computing module 210, for each array 206, can aggregate the index values 304 for each disk 216 of the array 206 (e.g., calculate a summation of the index values 304 for each disk 216 of the array 206) to provide the DWI value 230 for each array 206.

The IDU computing module 210 can compare, for each array 206, the DWI value 230 for the array 206 to a DWI threshold 208. Specifically, the DWI threshold 208 can be an indicator for balancing firmware activation actions for the arrays 206 while also minimizing, or reducing, I/O impact of the arrays 206 during the updating process. The DWI threshold 208 can be configurable (e.g., based on the application desired). In some examples, the DWI threshold 208 is two.

The IDU computing module 210 can determine, based on the comparing, that the DWI value 230 for the array 206a is greater than the DWI threshold 208. Specifically, when the DWI value 230 for the array 206a is greater than the DWI threshold 208, the IDU computing module 210 can position the array 206a and the disks 216 of the array 206a into a pending activation list that can be considered for firmware activation, described further herein. For example, when the DWI value 230 for the array 206a is greater than the DWI threshold 208, the IDU computing module 210 can evaluate the I/O metrics of the disks 216 of the array 206a against an activation threshold, a counter threshold, and a time threshold, described further herein.

In response to determining that the DWI value 230 for the array 206a is greater than the DWI threshold 208, the IDU computing module 210 can aggregate the I/O metrics for each disk 216 of the array 206a. Specifically, the IDU computing module 210, for the array 206a, can aggregate the I/O metrics for each disk 216 of the array 206a (e.g., calculate a summation of the I/O metrics for each disk 216 of the array 206a) to provide an aggregated I/O metrics for the array 206a. FIG. 4 illustrates a graph 400 indicating aggregated I/O metrics for arrays 206. For example, for an array 206 that includes disks 216 that are tagged as ACTIVATION_TAKES_LONGER and WRKLD_ABOVE_THRESHOLD, the aggregated I/O metrics are a DWI value of 5 (an index value of 3 for the disk 216 indicated as WRKLD_ABOVE_THRESHOLD and an index value of 2 for the disk 216 indicates as ACTIVATION_TAKES_LONGER as indicated by the DWI 215 of FIG. 3).

Further, in response to determining that the DWI value 230 for the array 206a is greater than the DWI threshold 208, the IDU computing module 210 can compare the aggregated I/O metrics for the array 206a to an activation threshold 250.

In some examples, the activation threshold 250 is based on an usage of the array 206a being substantially zero. Further, in response to determining that the DWI value 230 for the array 206a is greater than the DWI threshold 208, the IDU computing module 210 can determine that the aggregated I/O metrics for the array 206a is less than the activation threshold 250. The IDU computing module 210 can then, in response to determining that the aggregated I/O metrics for the array 206a is less than the activation threshold 250, trigger firmware activation for the array 206a. That is, the IDU computing module 210 can trigger firmware activation for the disks 216 of the array 206a.

In some examples, the IDU computing module 210 can determine, based on the comparing, that the DWI value 230 for the array 206b is less than the DWI threshold 208. Specifically, when the DWI value 230 for the array 206b is less than the DWI threshold 208, the IDU computing module 210 can trigger firmware activation for the array 206a. That is, the IDU computing module 210 can trigger firmware activation for the disks 216 of the array 206b.

In some examples, further in response to determining that the DWI value 230 for the array 206a is greater than the DWI threshold 208, the IDU computing module 210 can determine that an activation counter associated with the array 206a is greater than or equal to a threshold counter 252. The threshold counter 252 can specify a number of times (during the polling) that the aggregated I/O metrics of the array 206a is less than the activation threshold 240 for triggering the firmware activation of the array 206a. In some examples, the threshold counter 252 is configurable. In some examples, the threshold counter 252 has a value of three. The IDU computing module 210, in response to determining that i) the DWI value 230 for the array 206a is greater than the DWI threshold 208 and ii) that the activation counter associated with the array 206a is greater than or equal to the counter threshold 252, can trigger firmware activation for the array 206a.

In some examples, the activation counter for the array 206a can be reset when the aggregated I/O metrics for the array 206a exceeds the counter threshold 252, or after firmware activation for the array 206a is triggered.

In some examples, further in response to determining that the DWI value 230 for the array 206a is greater than the DWI threshold 208, the IDU computing module 210 can determine that an activation counter associated with the array 206a is less than or equal to a threshold counter 252. The IDU computing module 210, in response to determining that the activation counter associated with the array 206a is less than the counter threshold 252, the IDU computing module 210 increases the activation counter associated with the array 206a.

In some examples, in response to determining that i) the DWI value 230 for the array 206a is greater than the DWI threshold 208 and ii) that the activation counter associated with the array 206a is less than or equal to the counter threshold 252, the IDU computing module 210 can determine that a time period associated with the array 206a is greater than a time threshold 254. The time period associated with the array 206a can indicate a time since previous firmware update, or a time period of attempting to perform the current firmware update. The IDU computing module 210 can, in response to determining that the time period associated with the array 206a is greater than the time threshold 254, can trigger firmware activation for the array 206a. In some examples, the time threshold 254 is configurable. In some examples, the time threshold 254 is twelve hours.

In some examples, the IDU computing module 210 can determine that the array 206n includes a mirrored array of disks. The IDU computing module 210, in response to determining that the array 206n includes a mirrored array of disks, can i) trigger parallel firmware activation for a first group of disks 216 of the array 206n, and ii) after triggering parallel firmware activation for the first group of disks 216 of the array 206n, trigger parallel firmware activation for a second group of disks 216 of the array 206n. In some examples, the second group of disks 206 of the array 206n is separate from the first group of disks 206 of the array 206n.

Figure 5:
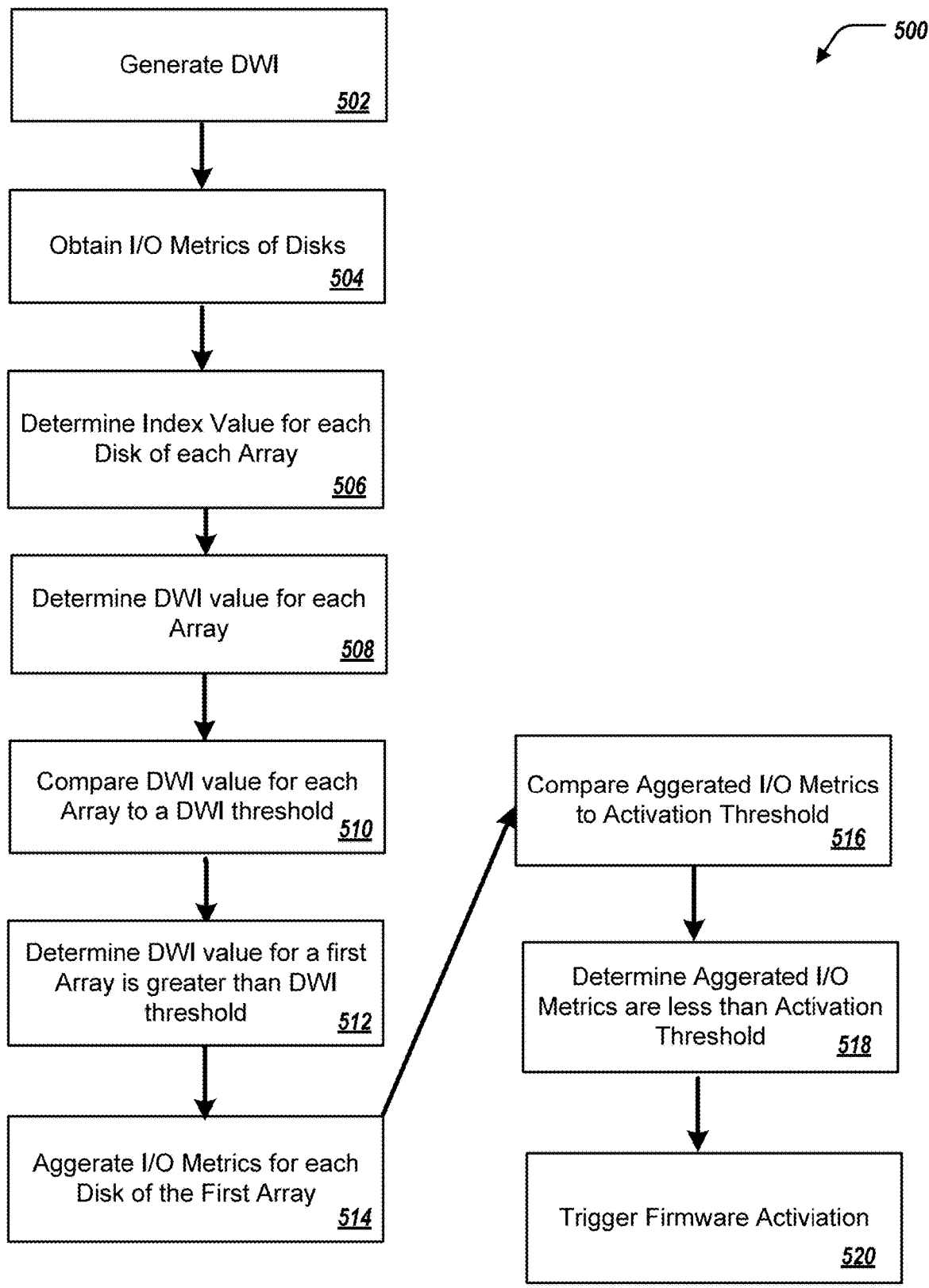
FIGS. 5, 6A, 6B illustrates respective methods for firmware activation in a RAID storage environment.

FIG. 5 illustrates a flowchart depicting selected elements of an embodiment of a method 500 for firmware activation in a RAID storage environment. The method 500 may be performed by the information handling system 100, the computing environment 200, the information handling system 202, and/or the IDU computing module 210 with reference to FIGS. 1-4. It is noted that certain operations described in method 500 may be optional or may be rearranged in different embodiments.

The IDU computing module 210 can generate the DWI 215 (502). The DWI 215 associates an index value with a respective pre-defined grouping of disks (or type of disk). The IDU computing module 210 can obtain, for each disk 216 of the arrays 206, input/output (I/O) metrics of the disks 216 (504). The IDU computing module 210 determines the index value 304 for each disk 216 for each array 206 (506). The IDU computing module 210 can determine, for each array 206, a DWI value 230 for the array 206 based on the index value 304 for each disk 216 of the array 206 (508). The IDU computing module 210 can compare, for each array 206, the DWI value 230 for the array 206 to a DWI threshold 208 (510). The IDU computing module 210 can determine, based on the comparing, that the DWI value 230 for the array 206a is greater than the DWI threshold 208 (512). In response to determining that the DWI value 230 for the array 206a is greater than the DWI threshold 208, the IDU computing module 210 can aggregate the I/O metrics for each disk 216 of the array 206a (514). Further in response, the IDU computing module 210 can compare the aggregated I/O metrics for the array 206a to an activation threshold 250 (516). Further in response, the IDU computing module 210 can determine that the aggregated I/O metrics for the array 206a is less than the activation threshold 250 (518). In response to determining that the aggregated I/O metrics for the array 206a is less than the activation threshold 250, trigger firmware activation for the array 206a (520).

Figure 6A:
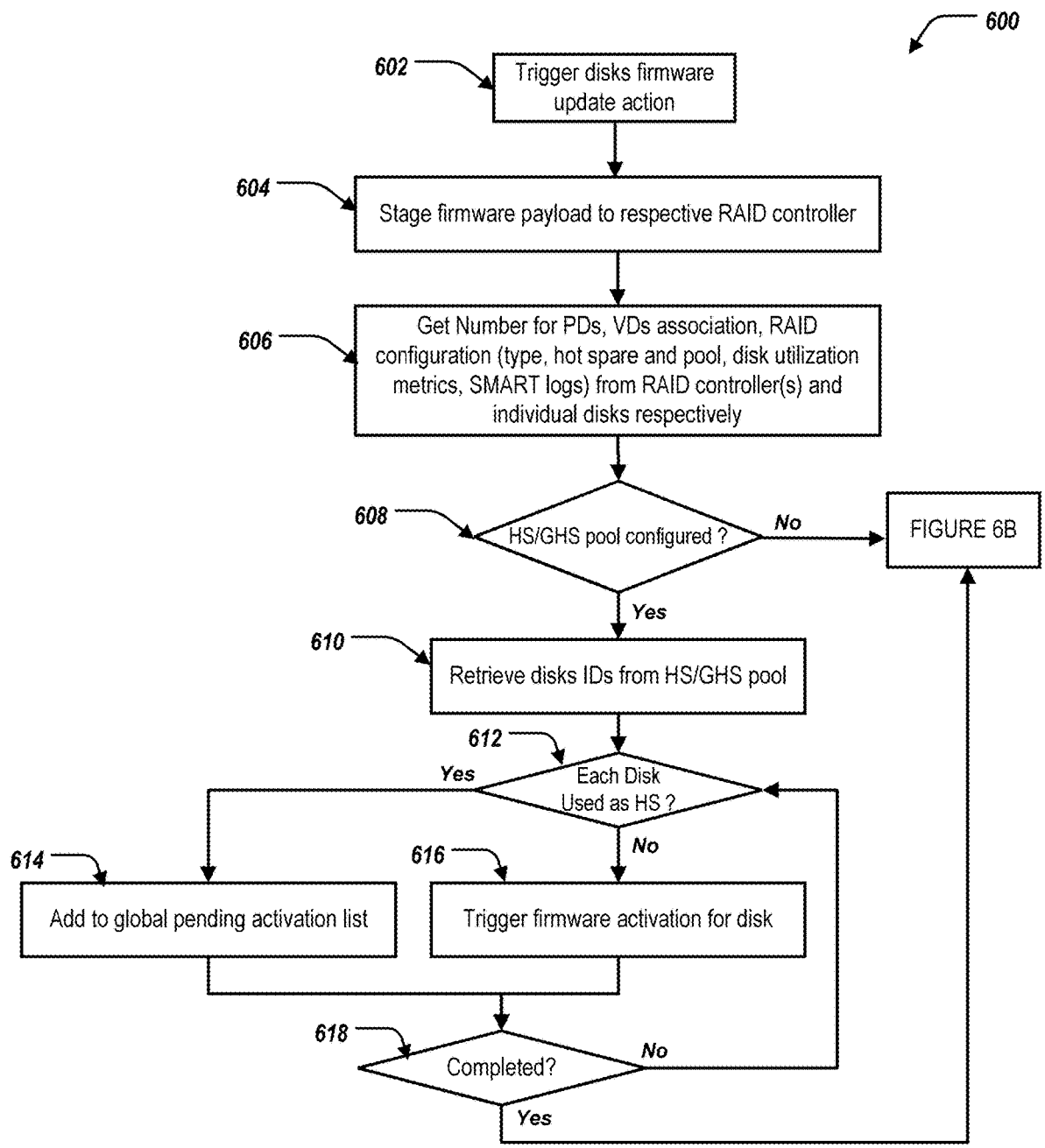
Figure 6B:
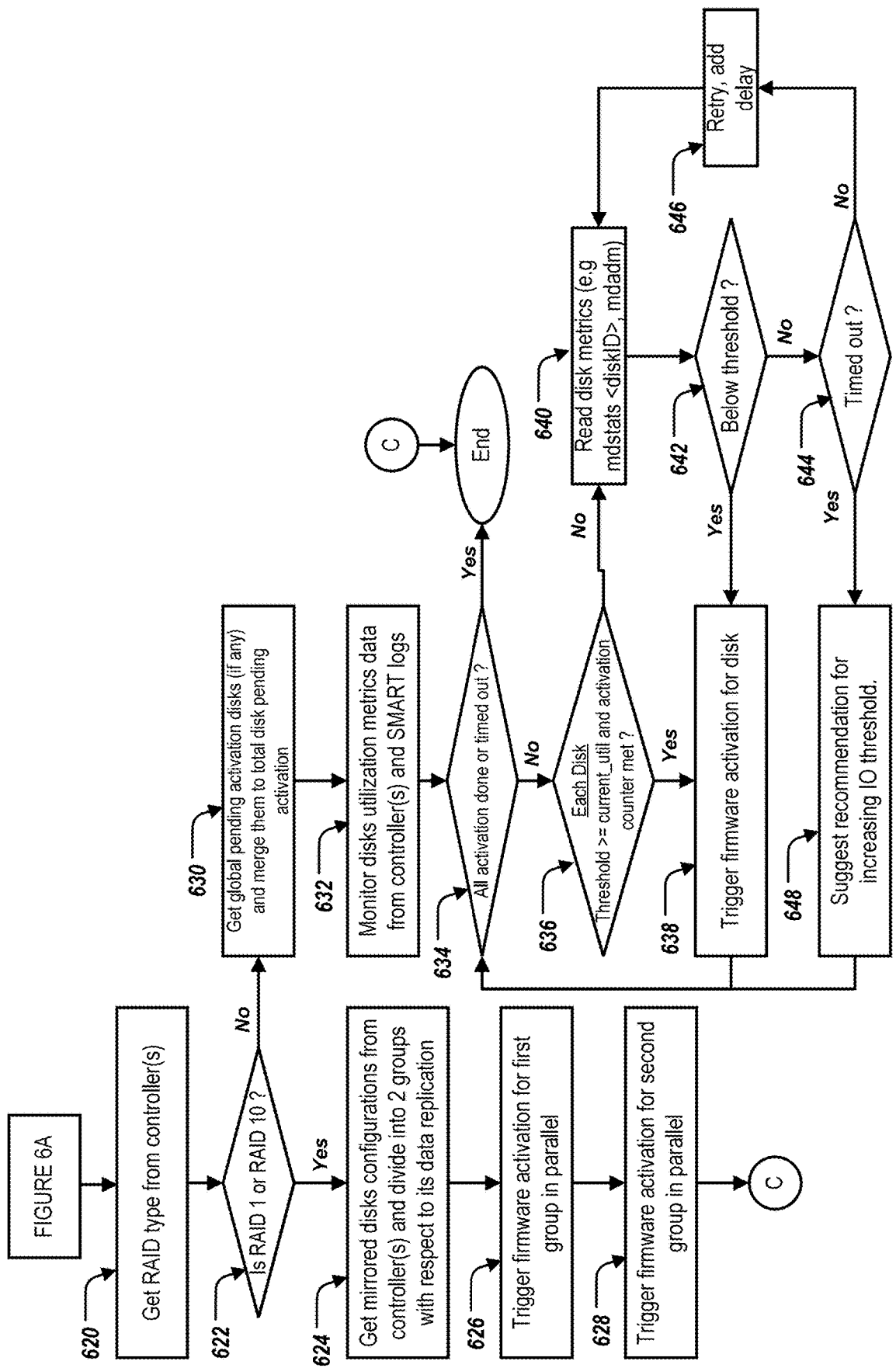

FIGS. 6A, 6B illustrate a flowchart depicting selected elements of an embodiment of a method 600 for firmware activation in a RAID storage environment. The method 600 may be performed by the information handling system 100, the computing environment 200, the information handling system 202, and/or the IDU computing module 210 with reference to FIGS. 1-4. It is noted that certain operations described in method 600 may be optional or may be rearranged in different embodiments.

The IDU computing module 210 triggers a firmware update action (602). The IDU computing module 210 stages firmware payload to the RAID controller computing module 204 (604). The IDU computing module 210 obtains data from the disks 206, the virtual disks 214, and the RAID controller computing module 204 (606). For example, the data can include I/O metrics such as type, hot spare and pool, disk utilization metrics, and SMART logs). The IDU computing module 210 determines if the hotspare/global hotspare (HS/GHS) pool is configured (608). If the IDU computing module 210 determines that the HS/GHS pool is configured, the IDU computing module 210 retrieves disks identifiers (IDs) from the HS/GHS pool (610). The IDU computing module 210 determines if each disk is used as a hotspare (HS) (612). When the IDU computing module 210 determines that a particular disk is used as a HS, the IDU computing module 210 adds the disks to the global pending activation list (614). When the IDU computing module 210 determines a particular disk is not used as a HS, the IDU computing module 210 triggers firmware activation for the disk. The IDU computing module 210 determines if there are further disks to evaluate (618). If the evaluation is not completed, the method returns to step 612. If the evaluation is completed, the method continues to step 620. Additionally, if the IDU computing module determines that the HS/GHS pool is not configured at step 608, the method also proceeds to step 620.

The IDU computing module 210 obtains a RAID type from the RAID controller computing module 204 (620). The IDU computing module 210 determines whether the array is of type RAID 1 or RAID 10 (622). When the IDU computing module 210 determines that the array is of type RAID 1 or RAID 10, the IDU computing module 210 obtains mirrored disk configurations from the RAID controller computing module 204 and divides such into two groups with respect to the array's data replication (624). The IDU computing module 210 triggers firmware activation for a first group in parallel (626). The IDU computing module 210 triggers firmware activation for a second group in parallel (628).

When the IDU computing module 210 determines that the array is not of type RAID 1 or RAID 10, the IDU computing module 210 obtains the pending activation disks and merges such with the total disk pending activation list (630). The IDU computing module 210 monitors disk utilization metric data from the RAID controller computing module 204 and the SMART logs (632). The IDU computing module 210 determines if activation of all of the disks of the array is complete (634). If all activations are complete, the process ends. If activations of all of the disks are not complete, the IDU computing module 210 determines, for each disk of the array, if the activation threshold is greater than the current utilization of the array and if the counter threshold is met (636). If the activation threshold is greater than the current utilization of the array and the counter threshold is met, the IDU computing module 210 triggers firmware activation for the array (638). If the activation threshold is not greater than the current utilization and/or the counter threshold is not met, the IDU computing module 210 obtains disk metrics (e.g., mdstats, <diskID>, mdadm) (640). The IDU computing module 210 determines if the disk metrics are below the activation threshold (642). If the disk metrics are not below the activation threshold, the IDU computing module 210 determines if the time period is greater than the time threshold (644). If the time period is greater than the time threshold, the IDU computing module 210 provides a suggestion to the user of the computing environment 200 to increase the activation threshold (648). The process then continues back to step 634. If the time period is not greater than the time threshold, the IDU computing module 210 adds a delay (646), and the process returns to step 640.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    obtaining, for each individual disk of a plurality of arrays of disks, input/output (I/O) metrics of the disks;
    determining, for each individual disk of each array of disks, an index value for the disk based on a disk weighted index (DWI), the DWI associating index values with respective types of disks;
    determining, for each array of disks of the plurality of arrays of disks, a DWI value for the array of disks based on the index value for each individual disk of the array of disks;
    comparing, for each array of disks of the plurality of arrays of disks, the DWI value for the array of disks to a DWI threshold;
    determining, based on the comparing, that the DWI value for a first array of disks is greater than the DWI threshold, and in response:
        aggregating the I/O metrics for each individual disk of the first array of disks;
        comparing the aggregated I/O metrics for the first array of disks to an activation threshold;
        determining that the aggregated I/O metrics for the first array of disks is less than the activation threshold;
        in response to determining that the aggregated I/O metrics for the first array of disks is less than the activation threshold, triggering firmware activation for the first array of disks, and ii) updating, based on triggering the firmware activation, firmware for the first array of disks; and
        in response to determining that the aggregated I/O metrics for the first array of disks is less than the activation threshold, re-obtaining the I/O metrics of the first array of disks and determining whether the re-obtained I/O metrics are less than the activation threshold.

2. The computer-implemented method of claim 1, further comprising:
    determining, based on the comparing, that the DWI value for a second array of disks is less than the DWI threshold, and in response, triggering firmware activation for the second array of disks.

3. The computer-implemented method of claim 1, wherein the activation threshold is based on an usage of the first array of disks being substantially zero.

4. The computer-implemented method of claim 1, further comprising in response to determining that the DWI value for the first array of disks is greater than the DWI threshold:
    determining that an activation counter associated with the first array of disks is greater than or equal to a counter threshold; and
    in response to determining i) that the DWI value for the first array of disks is greater than the DWI threshold and ii) that the activation counter associated with the first array of disks is greater than or equal to the counter threshold, triggering firmware activation for the first array of disks.

5. The computer-implemented method of claim 1, further comprising in response to determining that the DWI value for the first array of disks is greater than the DWI threshold:
    determining that an activation counter associated with the first array of disks is less than a counter threshold; and
    in response to determining that the activation counter associated with the first array of disks is less than the counter threshold, increasing the activation counter.

6. The computer-implemented method of claim 5, further comprising:
    in response to determining that i) that the DWI value for the first array of disks is greater than the DWI threshold and ii) that the activation counter associated with the first array of disks is less than or equal to the counter threshold, determining that a time period associated with the first array of disks is greater than a time threshold; and
    in response to determining that the time period associated with the first array of disks is greater than the time threshold, triggering firmware activation for the first array of disks.

7. The computer-implemented method of claim 1, further comprising:
    determining that a third array of disks of the plurality of arrays of disks includes a mirrored array of disks, and in response:
        triggering parallel firmware activation for a first group of disks of the third array of disks; and
        after triggering parallel firmware activation for the first group of disks of the third array of disks, triggering parallel firmware activation for a second group of disks of the third array of disks, the second group of disks separate from the first group of disks.

8. An information handling system, comprising:
    a memory media storing instructions;
    a processor in communication with the memory media to execute the instructions to perform operations comprising:
        obtaining, for each individual disk of a plurality of arrays of disks, input/output (I/O) metrics of the disks;
        determining, for each individual disk of each array of disks, an index value for the disk based on a disk weighted index (DWI), the DWI associating index values with respective types of disks;

determining, for each array of disks of the plurality of arrays of disks, a DWI value for the array of disks based on the index value for each individual disk of the array of disks;

comparing, for each array of disks of the plurality of arrays of disks, the DWI value for the array of disks to a DWI threshold;

determining, based on the comparing, that the DWI value for a first array of disks is greater than the DWI threshold, and in response:

aggregating the I/O metrics for each individual disk of the first array of disks;

comparing the aggregated I/O metrics for the first array of disks to an activation threshold;

determining that the aggregated I/O metrics for the first array of disks is less than the activation threshold;

in response to determining that the aggregated I/O metrics for the first array of disks is less than the activation threshold, triggering firmware activation for the first array of disks, and ii) updating, based on triggering the firmware activation, firmware for the first array of disks; and in response to determining that the aggregated I/O metrics for the first array of disks is less than the activation threshold, re-obtaining the I/O metrics of the first array of disks and determining whether the re-obtained I/O metrics are less than the activation threshold.

9. The information handling system of claim 8, the operations further comprising:

determining, based on the comparing, that the DWI value for a second array of disks is less than the DWI threshold, and in response, triggering firmware activation for the second array of disks.

10. The information handling system of claim 8, wherein the activation threshold is based on an usage of the first array of disks being substantially zero.

11. The information handling system of claim 8, the operations further comprising in response to determining that the DWI value for the first array of disks is greater than the DWI threshold:

determining that an activation counter associated with the first array of disks is greater than or equal to a counter threshold; and in response to determining i) that the DWI value for the first array of disks is greater than the DWI threshold and ii) that the activation counter associated with the first array of disks is greater than or equal to the counter threshold, triggering firmware activation for the first array of disks.

12. The information handling system of claim 8, the operations further comprising in response to determining that the DWI value for the first array of disks is greater than the DWI threshold:

determining that an activation counter associated with the first array of disks is less than a counter threshold; and in response to determining that the activation counter associated with the first array of disks is less than the counter threshold, increasing the activation counter.

13. The information handling system of claim 12, the operations further comprising:

in response to determining that i) that the DWI value for the first array of disks is greater than the DWI threshold and ii) that the activation counter associated with the first array of disks is less than or equal to the counter threshold, determining that a time period associated with the first array of disks is greater than a time threshold; and in response to determining that the time period associated with the first array of disks is greater than the time threshold, triggering firmware activation for the first array of disks.

14. The information handling system of claim 8, the operations further comprising:

determining that a third array of disks of the plurality of arrays of disks includes a mirrored array of disks, and in response:

triggering parallel firmware activation for a first group of disks of the third array of disks; and after triggering parallel firmware activation for the first group of disks of the third array of disks, triggering parallel firmware activation for a second group of disks of the third array of disks, the second group of disks separate from the first group of disks.

15. A non-transitory computer-readable medium storing software comprising instructions executable by one or more computers which, upon such execution, cause the one or more computers to perform operations comprising:

obtaining, for each individual disk of a plurality of arrays of disks, input/output (I/O) metrics of the disks;

determining, for each individual disk of each array of disks, an index value for the disk based on a disk weighted index (DWI), the DWI associating index values with respective types of disks;

determining, for each array of disks of the plurality of arrays of disks, a DWI value for the array of disks based on the index value for each individual disk of the array of disks;

comparing, for each array of disks of the plurality of arrays of disks, the DWI value for the array of disks to a DWI threshold;

determining, based on the comparing, that the DWI value for a first array of disks is greater than the DWI threshold, and in response:

aggregating the I/O metrics for each individual disk of the first array of disks;

comparing the aggregated I/O metrics for the first array of disks to an activation threshold;

determining that the aggregated I/O metrics for the first array of disks is less than the activation threshold;

in response to determining that the aggregated I/O metrics for the first array of disks is less than the activation threshold, triggering firmware activation for the first array of disks, and ii) updating, based on triggering the firmware activation, firmware for the first array of disks; and in response to determining that the aggregated I/O metrics for the first array of disks is less than the activation threshold, re-obtaining the I/O metrics of the first array of disks and determining whether the re-obtained I/O metrics are less than the activation threshold.

16. The computer-readable medium of claim 15, the operations further comprising:

determining, based on the comparing, that the DWI value for a second array of disks is less than the DWI threshold, and in response, triggering firmware activation for the second array of disks.

17. The computer-readable medium of claim 15, wherein the activation threshold is based on an usage of the first array of disks being substantially zero.

18. The computer-readable medium of claim 15, the operations further comprising in response to determining that the DWI value for the first array of disks is greater than the DWI threshold:
- determining that an activation counter associated with the first array of disks is greater than or equal to a counter threshold; and
- in response to determining i) that the DWI value for the first array of disks is greater than the DWI threshold and ii) that the activation counter associated with the first array of disks is greater than or equal to the counter threshold, triggering firmware activation for the first array of disks.

19. The computer-readable medium of claim 15, the operations further comprising in response to determining that the DWI value for the first array of disks is greater than the DWI threshold:
- determining that an activation counter associated with the first array of disks is less than a counter threshold; and
- in response to determining that the activation counter associated with the first array of disks is less than the counter threshold, increasing the activation counter.

20. The computer-readable medium of claim 19, the operations further comprising:
- in response to determining that i) that the DWI value for the first array of disks is greater than the DWI threshold and ii) that the activation counter associated with the first array of disks is less than or equal to the counter threshold, determining that a time period associated with the first array of disks is greater than a time threshold; and
- in response to determining that the time period associated with the first array of disks is greater than the time threshold, triggering firmware activation for the first array of disks.

* * * * *